Oct. 1, 1940.  S. WARE  2,216,148
SLED CONSTRUCTION
Filed Nov. 28, 1938
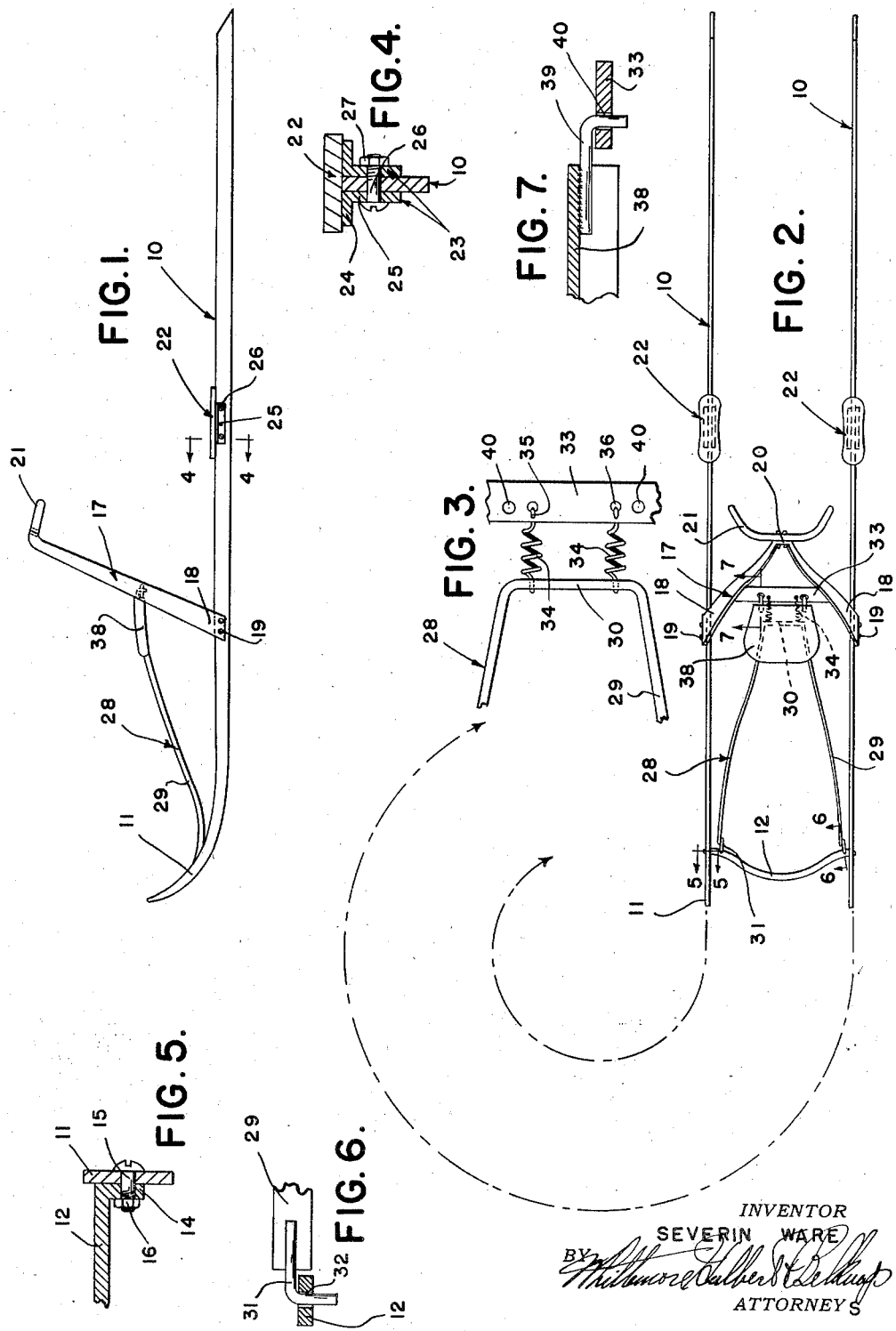
INVENTOR
SEVERIN WARE
BY
ATTORNEYS Patented Oct. 1, 1940

2,216,148

UNITED STATES PATENT OFFICE 2,216,148

SLED CONSTRUCTION

Severin Ware, Grosse Pointe Farms, Mich.

Application November 28, 1938, Serial No. 242,813

3 Claims. (Cl. 280—23)

This invention relates generally to sleds and refers more particularly to a sled of the type capable of being propelled by a pushing motion of one foot of the operator.

One of the principal features of this invention resides in the provision of a sled composed of a relatively few simple parts capable of being inexpensively manufactured and readily assembled.

Another advantageous feature of the present invention consists in the provision of a sled having a handle bar located in a position to be comfortably grasped by the operator while in a standing position on one or both runners of the sled and having relatively long highly flexible runners rendering it possible to readily turn the sled through a small arc by exerting pressure either directly on one or the other runner by proper manipulation of the operator's feet, or by applying the pressure to the runners through the handle bar.

The foregoing, as well as other objects, will be made more apparent as this description proceeds, especially when considered in connection with the accompanying drawing, wherein:

Figure 1 is a side elevational view of a sled constructed in accordance with this invention;

Figure 2 is a top plan view of the construction shown in Figure 1;

Figure 3 is an enlarged fragmentary plan view;

Figure 4 is an enlarged cross sectional view taken substantially on the plane indicated by the line 4—4 of Figure 1;

Figures 5 to 7, inclusive, are, respectively, large sectional views taken substantially on the planes indicated by the lines 5—5, 6—6, and 7—7 of Figure 2.

The sled, selected herein for the purpose of illustration, comprises a pair of substantially parallel laterally spaced runners 10 having upwardly curved portions 11 at the forward end connected together by means of a cross brace 12 preferably formed of light gauge sheet metal and having depending flanges 14 at opposite ends secured to the runners. Upon reference to Figure 5, it will be noted that flanges 14 are removably secured to the runners by means of the bolts 15 and nuts 16. The construction is such as to permit the cross brace to be readily secured to and removed from the runners.

The runners 10 are further connected at a point spaced rearwardly from the cross brace 12 by means of a fork or inverted U-shaped member 17 also formed of sheet metal and having the free ends of the leg portions 18 removably secured to the sides of the runners in the same manner as the cross brace 12 by means of the bolts 19. As shown in Figure 2, the leg portions 18 extend upwardly from the runners and taper inwardly with respect to the runners to locate the intermediate connecting portion 20 substantially midway between the two runners. The connecting portion 20 of the fork is bent to lie in a substantially vertical plane and a handle bar 21 is bolted, or otherwise secured to the connecting portion. The height of the fork is predetermined to permit the handle bar to be conveniently grasped by both hands of the operator when standing on either or both of the runners in rear of the fork. For this purpose, a foot supporting pad 22 is secured to each runner 10 in rear of the fork 17. As shown in Figure 4, the foot engaging pads 22 are preferably formed of sheet metal and are removably secured to the runners 10. In detail, each pad is provided with a pair of opposed angle brackets 23 having oppositely extending flanges 24 at the upper end welded, or otherwise permanently secured to the underside of the foot pad and having opposed vertical flanges 25 spaced laterally from each other a sufficient distance to receive the upper edge portion of the runner therebetween. The vertical flanges 25 of each supporting pad are removably secured to each runner by means of a pair of bolts 26 and nuts 27.

The cross brace 12, interconnecting the forward ends of the runners, is connected to the fork 17 by means of a U-shaped sheet metal brace 28 having the leg portions 29 tapered outwardly from the base portion 30 and hooked at their extremities to the opposite end portions of the cross brace 12. As shown in Figure 6, each of the legs 29 has a hook 31 secured to the free end thereof and these hooks are adapted to be extended through openings 32 formed in the cross brace. The base 30 of the U-shaped brace 28 is connected to a cross bar 33 interconnecting the legs 18 of the fork 17. The connection between the brace 28 and cross bar 33 comprises a pair of springs 34 having the forward ends connected to the base 30 of the brace 28 and having hooks 35 at the rear ends extended through openings 36 in the cross bar 33. If desired, the base 30 of the brace 28 may be rigidly secured to the cross bar 33, but I prefer the spring connection illustrated in that it not only overcomes any tendency for the legs 29 of the brace 28 to buckle when the forward portions of the runners are placed under stress, but at the same time affords a spring support for the passenger seat 38. The seat 38 is shown in Figure 2 as resting upon the brace 28 and, inasmuch as the brace is yieldably connected to the fork through the medium of the springs 34, it follows that a certain amount of resiliency is imparted to the seat. The rear edge of the seat is detachably connected to the cross bar 33 by means of the hooks 39 shown in Figure 7. These hooks are welded, or otherwise secured to the rear edge of the seat at spaced points and the angular free end portions thereof are merely extended through openings 40 in the cross bar 33.

The runners 10 of the sled comprise a pair of laterally spaced substantially flat flexible steel strips of relatively light gauge arranged to have an edge engagement with the ground and are free of connection with each other in rear of the fork 17. The construction is such that the sled can be turned in either direction through a small arc by applying pressure to one or the other of the runners. This pressure may either be applied directly to the runners by proper manipulation of the operator's feet, or may be applied indirectly to the runners through the medium of the handle bar. In either case, the sled is highly sensitive to the application of pressure to either runner and, consequently, may be turned with comparatively litle effort.

What I claim as my invention is:

1. A sled having laterally spaced runners comprising flat strips of relatively thin flexible steel supported to have an edge engagement with the ground, an inverted substantially U-shaped brace having the free ends respectively secured to the runners intermediate the ends of the latter and having gripping means at the upper end thereof, a second substantially U-shaped brace having the free ends positioned adjacent to the forward ends of the runners, means connecting the free ends of the second brace to the runners, and spring means connecting the base of the second brace to the inverted U-shaped brace at an elevation above the runners.

2. A sled having laterally spaced runners comprising flat strips of relatively thin flexible steel supported to have an edge engagement with the ground, an inverted substantially U-shaped brace having the free ends respectively secured to the runners intermediate the ends of the latter and having means at the upper end forming a grip for the operator, a cross brace interconnecting the forward ends of the runners, a second U-shaped brace having hooked portions at the free ends of the legs extending through openings in opposite ends of the cross brace, and yieldable means connecting the base of the second U-shaped brace to the inverted U-shaped brace permitting relative movement between said braces.

3. A sled having laterally spaced runners comprising flat strips of relatively thin flexible steel supported to have an edge engagement with the ground, an inverted substantially U-shaped brace having the free ends respectively secured to the runners adjacent the forward ends of the latter and having a handle bar secured to the base of the U-shaped brace, a cross brace interconnecting the forward ends of the runners, a second U-shaped brace having hooked portions at the free ends of the legs extending through openings in opposite ends of the cross brace, springs connecting the base of the second U-shaped brace to the inverted U-shaped brace, and a seat removably connected to the inverted U-shaped brace and resting on the base portion of the second U-shaped brace.

SEVERIN WARE.